US007321302B2

(12) United States Patent
Beghelli

(10) Patent No.: US 7,321,302 B2
(45) Date of Patent: Jan. 22, 2008

(54) CENTRAL TEST RADIO FREQUENCY SYSTEM FOR EMERGENCY LIGHTING

(75) Inventor: Gian Pietro Beghelli, Bologna (IT)

(73) Assignee: Beghelli S.p.A, Monteveglio Bologna (IT)

( * ) Notice: Subject to any disclaimer, the term of this patent is extended or adjusted under 35 U.S.C. 154(b) by 253 days.

(21) Appl. No.: 11/121,601

(22) Filed: May 4, 2005

(65) Prior Publication Data

US 2006/0139161 A1 Jun. 29, 2006

(30) Foreign Application Priority Data

Dec. 10, 2004 (IT) ........................... VI2004A0286
Mar. 25, 2005 (IT) ........................... VI2005A0087

(51) Int. Cl.
*G08B 1/08* (2006.01)
*H04Q 7/00* (2006.01)

(52) U.S. Cl. ................................. 340/540; 340/539.17

(58) Field of Classification Search ................ 340/540, 340/531, 870.03, 539.17, 539.22
See application file for complete search history.

(56) References Cited

U.S. PATENT DOCUMENTS 5,148,158 A * 9/1992 Shah .......................... 340/3.7
6,078,269 A 6/2000 Markwell et al.
6,437,692 B1 * 8/2002 Petite et al. ................ 340/540
6,538,568 B2 * 3/2003 Conley, III ................. 340/540
7,053,767 B2 * 5/2006 Petite et al. ................ 340/540
2001/0038336 A1 11/2001 Acevendo
2002/0080027 A1 6/2002 Conley, III

FOREIGN PATENT DOCUMENTS

WO WO 2006/061254 6/2006

* cited by examiner

*Primary Examiner*—John Tweel, Jr.
(74) *Attorney, Agent, or Firm*—Hedman & Costigan; James V. Costigan

(57) ABSTRACT

A central test radio frequency system for emergency lighting comprising a set of emergency light units or emergency lamps (L1-L13) and a remote control unit (CU) that manages the system's functionality, wherein each of said emergency lamps (L1-L13) has a radio transmitter-receiver (MR), which is able to communicate to each of said emergency lamps and to the remote control unit (CU) via radio signals.

17 Claims, 5 Drawing Sheets

CENTRAL TEST RADIO FREQUENCY SYSTEM FOR EMERGENCY LIGHTING

CROSS-REFERENCE TO RELATED APPLCIATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

BACKGROUND OF THE INVENTION (1) Field of the Invention

The present invention refers to a central test radio frequency system for emergency lighting.

More particularly, the invention relates to an emergency lighting system comprising a set of emergency light units or emergency lamps which communicate to each other via radio signals.

(2) Description of Related Art

Emergency lighting systems comprising a set of emergency lamps, wherein each of said lamps has auto-test devices for controlling the correct functionality are known; in this case, the functions of the battery's testing and of the lamp's testing are incorporated in each emergency light unit.

Emergency lighting systems, so called central test systems, are also known, wherein a central unit receives testing information and the operator is able to send commands to each emergency lamp, in order to synchronize the testing procedures and to configure the emergency lighting units.

However, the emergency light units of the known central test systems for emergency lighting communicate to the central control unit by means of wires or cables, thus having serious drawbacks concerning the system installation and maintenance.

An object of the present invention is to provide for a central test system for emergency lighting, which allows for a better installation of the system and for a easier maintenance, with respect to known emergency lighting systems.

Another object of the present invention is to provide for a central test system for emergency lighting, which allows the central testing of the emergency lighting units within one or more buildings from a single location.

A further object of the present invention is to provide for a central test system for emergency lighting, which is reliable and safe, efficient, easy to manage and cost-effective to manufacture, with respect to the known systems.

BRIEF SUMMARY OF THE INVENTION

These and other objects are achieved by providing for a central test system for emergency lighting comprising a set of emergency light units or emergency lamps (L1-L13) and at least one remote control unit (CU) which is provided for sending and receiving signals to/from said emergency light units (L1-L13) for carrying out functionality tests of said light units (L1-L13), said emergency light units (L1-L13) being also able to carry out diagnostic tests either automatically or due to commands sent by said remote control unit (CU), wherein each of said emergency light units (L1-L13) has a radio frequency transmitter-receiver (MR), which is able to communicate to each other emergency light units (L1-L13) and to the remote control unit (CU) via radio signals, also using said emergency light units (L1-L13) as signal repeaters.

The central test radio frequency system (called "CTRF" system) for emergency lighting of the present invention is a labour saving system that allows the testing of the emergency light units within one or more buildings from a single location.

The central test system is a completely wireless system, where the devices communication is by means of radio frequency signals.

The system is composed of a set of emergency light units (also called emergency lamps in the following), spread all over the buildings and a control unit that manages the system's functionality.

BRIEF DESCRIPTION OF THE SEVERAL VIEWS OF THE DRAWINGS

Each unit is supplied by the power grid as usual.

Further characteristics and advantages of the invention shall become clearer from the following description, given as an example and not with limiting purposes, and from the attached figures, in which.

DETAILED DESCRIPTION OF THE INVENTION

Figure 1:
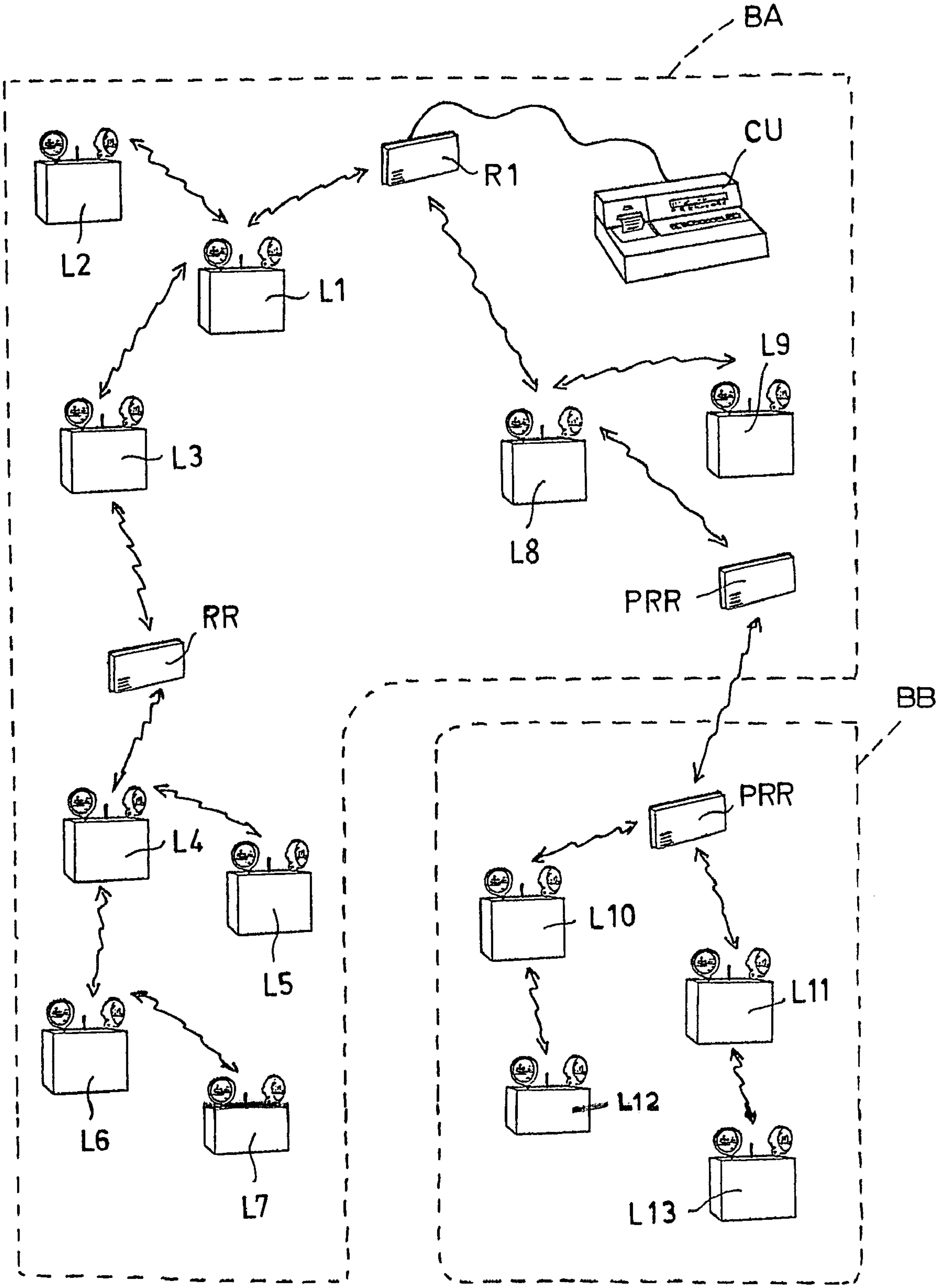
FIG. 1 is a diagrammatic scheme of the central test radio frequency system for emergency lighting according to the present invention.
Figure 2:
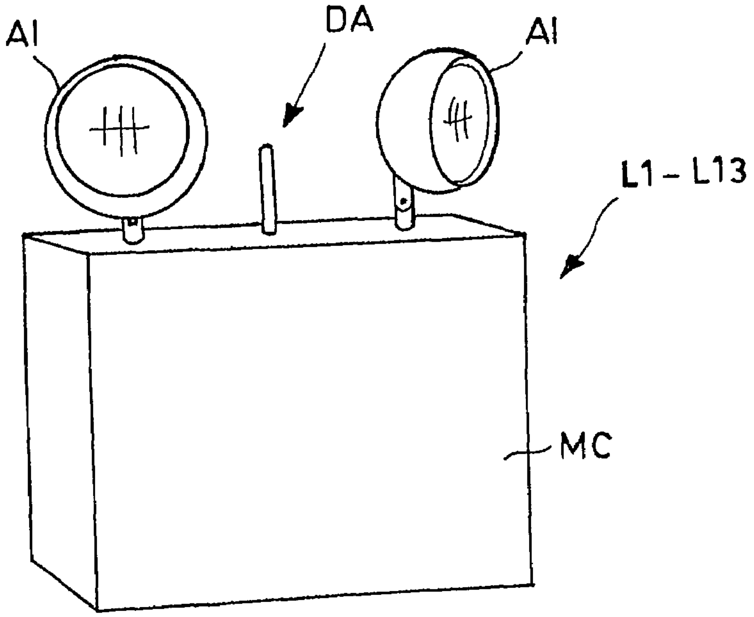
FIG. 2 is a perspective view of a first embodiment of an emergency light unit with radio frequency communication according to the present invention.
Figure 3:
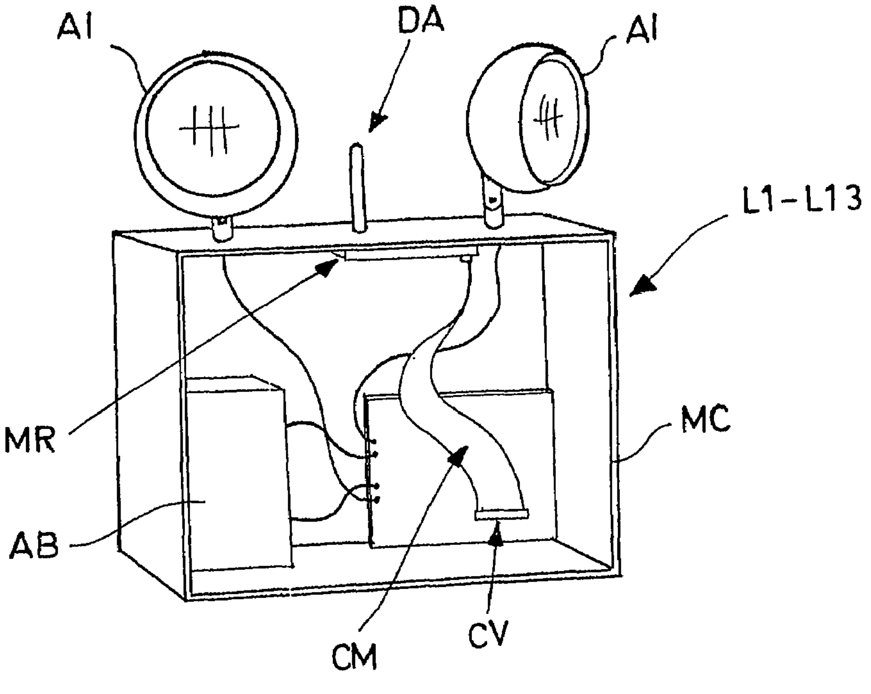
FIG. 3 shows the proposed execution of the electronic part of the central test radio frequency emergency light unit of FIG. 2.

With reference to the FIGS. 1-3, the central test radio frequency system (called "CTRF" system) for emergency lighting of FIG. 1 allows the testing of the emergency light units L1-L13 within one or more buildings BA, BB from a single location.

The CTRF system is a completely wireless system, where the devices communication is by means of radio frequency signals.

The CTRF system is composed by a set of said emergency light units L1-L13 (also called emergency lamps in the following), spread all over the buildings BA, BB, and a remote control unit CU that manages the system's functionality; each unit L1-L13 is supplied by the power grid as usual.

The emergency lamps L1-L13 communicate to each other via radio signals.

Each emergency light unit L1-L13 acts as a repeater; when the control unit CU needs to send or receive information to/from a certain emergency lamp L1-L13, it simply reaches that unit through the best available path, the data packet passing from one unit to the other.

For instance, with reference to FIG. 1, the control unit CU talks with the lamp L7 using the lamps L1, L3, L4, L6 as repeaters.

The remote control unit CU continuously looks for the best paths available and for alternative paths in case of path loss in the system to ensure the communication of all its units L1-L13.

The system is designed to operate at full functionality if each emergency lamp L1-L13 is able to exchange information at least with the nearest lamp in the system and if there is, for every emergency lamp L1-L13, a path that connects it to the remote control unit CU passing at least with all the other lamps L1-L13 acting as repeaters.

In cases where during the installation is not convenient to add normal emergency lamps used as repeaters to connect parts that cannot otherwise be linked, the system comprises also special devices, the repeaters RR, that are not emergency lamps but simply radio transceivers.

As illustrated in FIG. 1, there are also power repeaters PRR available, which are to be used in case when a radio link is needed between buildings BA, BB or between strongly separated blocks inside the same building.

In the example of FIG. 1 the main building BA (in which the remote control unit CU is installed) is linked to the building BB via a couple of power repeaters PRR.

Each emergency light unit L1-L13 is able to perform diagnostic functions, either automatically or triggered by commands received from the remote control unit CU.

At the same time, the control unit CU continuously collects the test reports that come out from the diagnostic activity, and displays them on a display. The control unit CU can be remote controlled if properly connected to the standard telecommunication networks.

In particular, each emergency light unit L1-L13 is designed to operate in the 902-928 MHz frequency band without individual license.

In compliance with USA (FCC) and Canada government requirements the operation in this band is implemented with the frequency hopping technique.

Each emergency unit L1-L13 with metal case MC has a 900 MHz dipole antenna DA about 8 cm long out of the enclosure's surface (FIG. 2).

Each emergency lamp L1-L13 is completely managed by the control unit CU and all the actions on each emergency light unit L1-L13 can be taken from the control unit's console.

The only need would eventually be to have a single button inside the emergency light unit L1-L13 (eventually not accessible from outside the unit), to set the two functions of test and calibration that eventually could be available to the installer.

Immediately after the installation the installer needs to check that all the lamps bulbs have been properly connected to each emergency light unit L1-L13, and needs to calibrate the circuit in order to make the correct measure of the installed bulbs load. These requirements are satisfied with a single button that, when pressed, switches on the lamp bulbs for several seconds and sets a calibration of the testing circuit.

Alternatively all the set up functions and calibration functions can be executed by the installer operating on the remote unit CU.

The CTRF emergency light unit L1-L13 has also the following characteristics:

- one switch for the calibration of the output load for the lamps integrity test and the manual reset of the test faults (if pressed for more than 5 seconds);.
- one bicolor led for signaling the lamp state and the test reports;
- one red led for the charging state of the battery charger;
- eventually one switch for the local test of lamp and battery function.

The operation of the emergency lighting function is neither impeded by the communication.

Every CTRF emergency light unit L1-L13 is completely autonomous.

If the communication link with the control unit CU is out of service for any reason, the lamp emergency function is not altered; if the mains power goes off the emergency lamp switches ON and the emergency function works as it's been configured for each unit at the system set up.

The CTRF system addresses each single emergency light unit L1-L13 and the control unit CU is capable of working selectively on subparts of the system, on groups of emergency lamps called "zones".

The operator is thus enabled to run tests and send commands selectively on:

- the whole system;
- one or more zones;
- a single emergency lamp or a set of emergency lamps.

The remote control unit CU controls all the emergency lamps L1-L13 and the other devices that are part of the system, polling continuously every device; therefore, the control unit CU is able to send commands and receive information to/from every emergency light unit L1-L13 of the system.

The commands sent can be:

- configuration commands;
- test triggering commands;
- test reset commands;
- lamp ON/OFF commands.

The information received from each emergency lamp L1-L13 can be:

- test report;
- emergency light unit state;
- emergency light unit set up configuration.

The operator is able to address each single emergency unit L1-L13 from the control unit CU and manage completely the unit's functions from the remote location.

The test functions are the three following:

- lamp integrity test;
- operational test;
- full duration test.

Each emergency light unit L1-L13, if enabled by the control unit CU, automatically executes lamp integrity tests verifying that all the bulbs AI connected to the two outputs of the circuit are good. The integrity test is able to identify a load difference of more than 10% of the initial load.

The lamp integrity test is automatically performed once every 24 hours.

Each emergency light unit L1-L13 automatically also executes the operational test periodically switching on the incandescent bulbs AI for 1 minute (or 5 minutes, depending on the system configuration, defined by the control unit) and checking the correct operation of the bulbs AI and of the battery AB.

The operational test is automatically performed once every 28 days (or every 30 days, depending on the system configuration, defined by the control unit CU).

Each emergency light unit L1-L13 automatically also executes the duration test periodically switching on the incandescent bulbs AI for 30 minutes (or 90 minutes, depending on the system configuration, defined by the control unit CU) and checking the correct operation of the bulbs AI and of the battery AB until the end of the test interval.

The operational test is automatically performed once every 6 months following the requirements of the various National versions as defined by the system configuration, which is set by the control unit CU.

For example, for Canada we will have 2 tests of 30 minutes separated by 24 hours at mid year and one 30 minutes test once a year; for USA we will have a 30 minutes test at mid year and a 90 minutes test once a year.

The results of the tests are displayed locally on each emergency light unit L1-L13 by means of a bicolor led; alternatively, since the complete complex state of the emergency light unit L1-L13 is reported to the control unit CU, the led indication could be simplified and the fault indications could be summarized in a unique signal on the emergency light unit L1-L13, like, for instance, an orange continuous flashing.

If this would be the case the operator should read the type of fault from the control unit CU.

Each test is performed periodically by each single emergency unit L1-L13 which is triggered automatically by the control unit CU, by means of the interface device R1, and may be manually triggered by the operator by means of a specific multiple key entry on the control unit keyboard.

The operator is able to individually trigger each single emergency light unit L1-L13 of the system.

Further special functions of each emergency light unit L1-L13 are provided.

For example, the emergency light unit L1-L13 activates itself only at the first power ON, when the mains is applied.

This way the installer is able to mount all the emergency light units L1-L13 connecting the batteries and activate all of them without discharging the batteries of the first units installed that meanwhile had lit their lamps during the installation.

The emergency lamps L1-L13 also switch off after a programmable delay following the mains recovery after a black-out; the delay can be 5 seconds, 1 minute or 15 minutes, depending on the system configuration, defined by the control unit CU.

Since the control unit CU has a calendar clock, it is possible to synchronize the automatic tests to obtain special performance, as:

- make duration tests only during the day, not at night;
- spread the tests in such a way that only one emergency lamp L1-L13 at a time or a small number of emergency lamps L1-L13 at a time make the duration test, in order to have most of the system always available in case of black-out;
- program specific calendar dates for the tests.

The emergency light unit configuration is completely defined by the control unit CU via a special menu.

Each emergency light unit L1-L13 is individually addressed in the system and is manufactured with its own unique address code.

Once the system is installed the operator starts on the control unit CU the automatic detection of the emergency light units L1-L13 available; the control unit CU searches for all the emergency lamps L1-L13 of the system.

As soon as the control unit CU has found every light unit L1-L13, the operator can view the emergency lamps list (reporting how many emergency lamps have been found and their codes) and check if all of them have been detected, at least having counted the whole number of emergency lamps L1-L13 installed and comparing it with the number of emergency lamps found.

The emergency light units L1-L13 can now be individually addressed to receive information or to send commands.

The operator can configure each single emergency lamp L1-L13 via special configuration menus on the control unit CU, and define the units' functions (tests characteristics, special modes of operation, etc.). The control unit CU has also several embedded serial data interfaces, that enable the connection to optional external communication devices.

For example, all the control unit's functions can be operated from an external PC connected to the control unit CU through a serial RS-232 interface.

This way the PC becomes the system's console and the operator uses the PC's keyboard and monitor by means of a "Windows" compatible program.

The control unit CU can also be connected to an external PSTN modem through a serial RS-232 interface; the modem enables the connection with a remote PC, equipped with another PSTN modem, that controls the CTRF system from a remote location.

The remote PC becomes the system's console and all the systems' functions are available from the remote location; the access to the system is protected with password.

A supervisory system which can be used in building automation environment will be able to make three kinds of operations on the CTRF system:

- configuration of the system;
- operate command functions;
- collect test results.

The control unit CU enables the connectivity versus supervisory building management systems by means of:

- a RS232 serial interface that can directly interconnect or connect via a modem;
- Ethernet interface that connects to a LAN or a WAN and transports the data with IP protocol;
- ECHELON.

Moreover, the interface to the supervisory system can be OPC or ECHELON.

There are three possible implementations of the proposed emergency unit.

For what concerns the integrated emergency and self-diagnosis unit, the annexed FIG. 3 shows a first proposed execution of the electronic part of each CTRF emergency light unit L1-L13.

The actual emergency light unit version would be used as the base circuit, slightly modified in several components, where the processor is substituted by an 18 pin connector for a flat cable CM which connects to the RF (radio frequency) transmitter-receiver module MR.

The RF module MR will integrate the processor which manages both the RF communication and the lamp test functions.

The RF module MR will have its integrated antenna DA, mounted outside the metal case MC of the light unit L1-L13 and isolated by a rubber cover stick coming out of the light unit's enclosure.

The RF module MR will be designed with the correct shape to easily fit inside the emergency unit's enclosure and can be fixed to the enclosure with double-layer adhesive film.

A second solution is applicable to all emergency units which already contain at least:

one incandescent lamp, and one battery.

Figure 4:
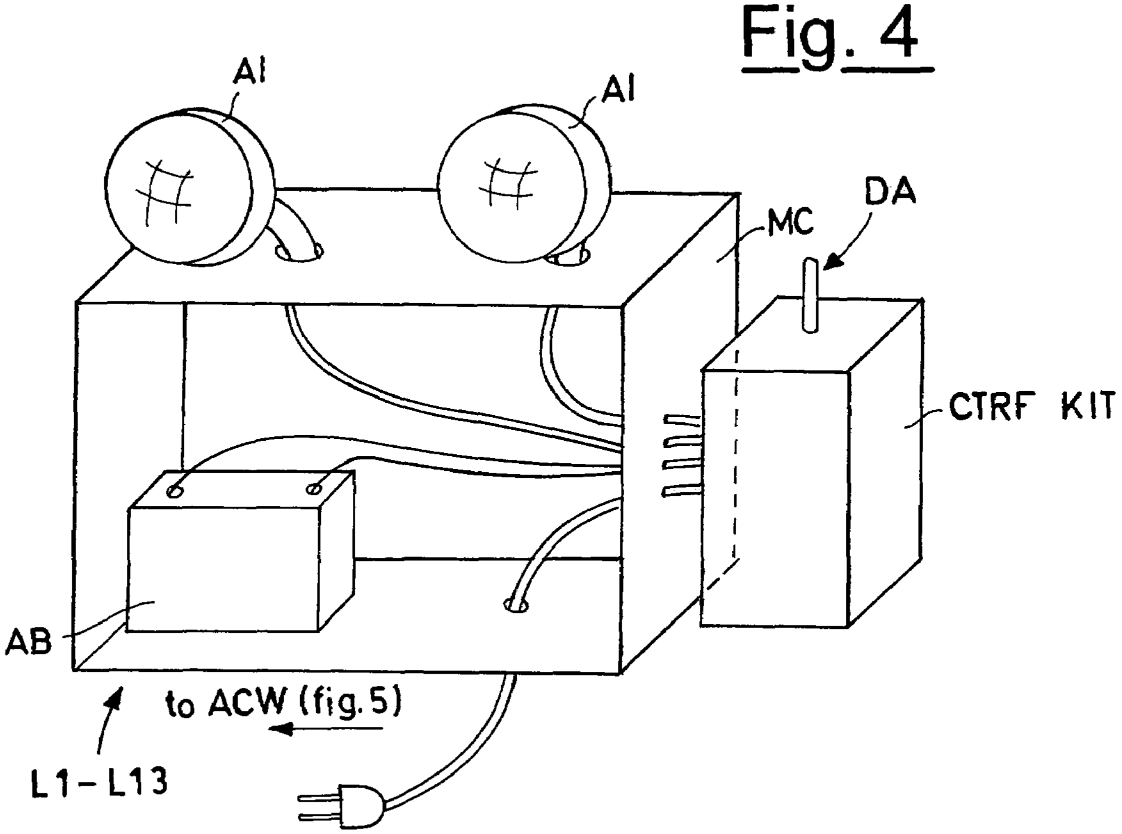
FIG. 4 is a perspective view of a second embodiment of an emergency light unit with radio frequency communication, according to the present invention.
Figure 5:
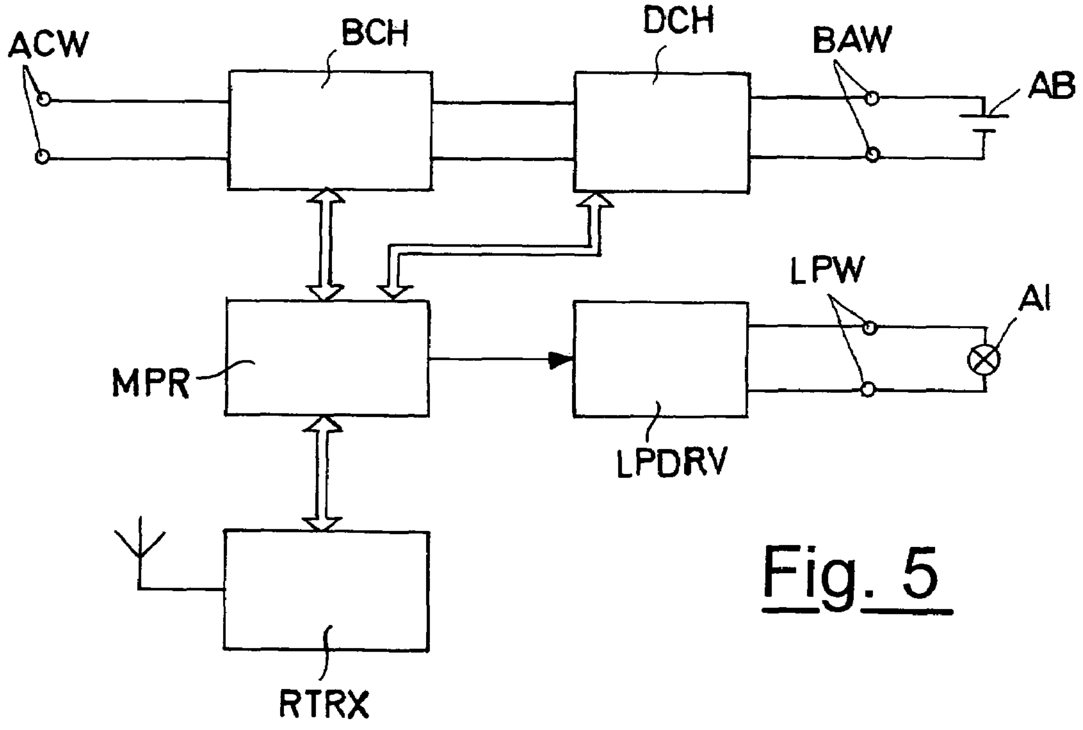
FIG. 5 is a block diagram of the central test radio frequency system applied to the emergency light unit shown in FIG. 4.

With reference to FIG. 4 and FIG. 5, a retrofit kit named as "CTRF Kit" is proposed.

The CTRF Kit is a box that contains all the means needed to implement the emergency lighting function, the diagnosis function and the radio frequency communication function, such as:

a lead battery charger BCH;

an incandescent lamp driver LPDRV;

a diagnostic circuitry DCH;

a radio transceiver RTRX; and a microprocessor MPR, that manages all the functions.

The CTRF kit can be mounted inside or outside the emergency light units L1-L13, depending on the case of the units.

If the enclosure is a metal one, the antenna must be kept outside the metal enclosure; it can be done either mounting the CTRF kit box outside the metal enclosure of the unit or mounting the CTRF kit box inside the metal enclosure letting the antenna be outside through a hole in the metal enclosure.

The retrofit KTRF is applicable to every existing emergency lamp appliance simply connecting the 6 wires of the existing emergency light unit L1-L13 to the CTRF box internal connector.

In particular:

2 wires LPW are connected to the incandescent lamps terminals (all the internal lamps AI of the light units L1-L13 are usually connected in parallel);

2 wires BAW are connected to the battery AB terminals (+terminal and −terminal); and 2 wires ACW are connected to the AC mains input which energizes the CTRF kit.

This way the CTRF kit is applied to an existing emergency lighting unit L1-L13 (containing at least only the incandescent lamps AI and the battery AB), obtaining the emergency lighting function with self diagnosis functionality.

The radio transceiver RTRX enables the control of the emergency appliance from a remote control unit.

The solution is especially advantageous because it is possible to upgrade the functions of any existing emergency lighting unit L1-L13 without changing the original box MC, only adding a smaller new box (the CTRF retrofit kit) that is simply connected to the existing elements of the original unit with at least 6 wires, as shown in FIG. 4.

Figure 6:
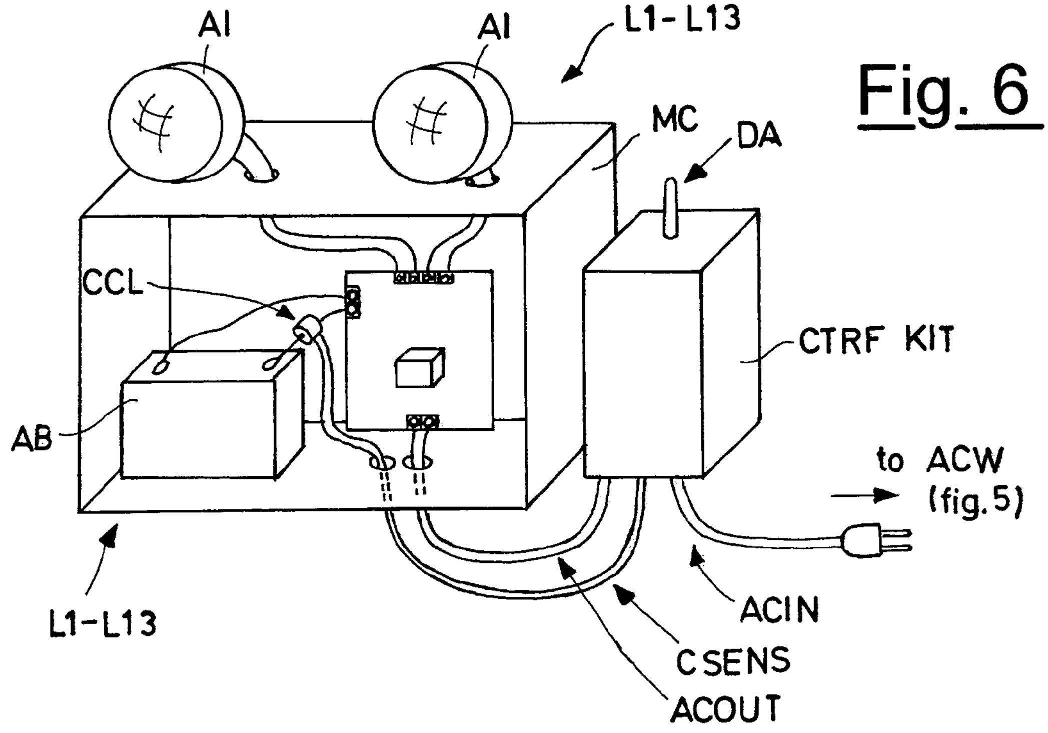
FIG. 6 is a perspective view of a third embodiment of an emergency light unit with radio frequency communication, according to the present invention.
Figure 7:
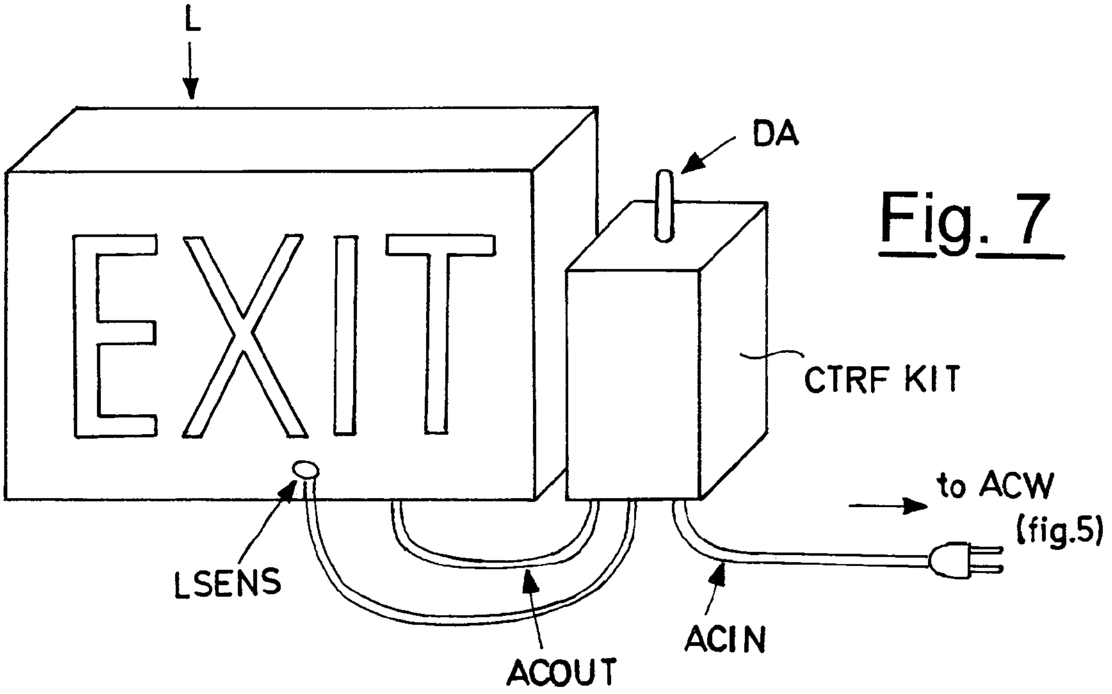
FIG. 7 is a perspective view of a fourth embodiment of an emergency light unit with radio frequency communication, according to the present invention.
Figure 8:
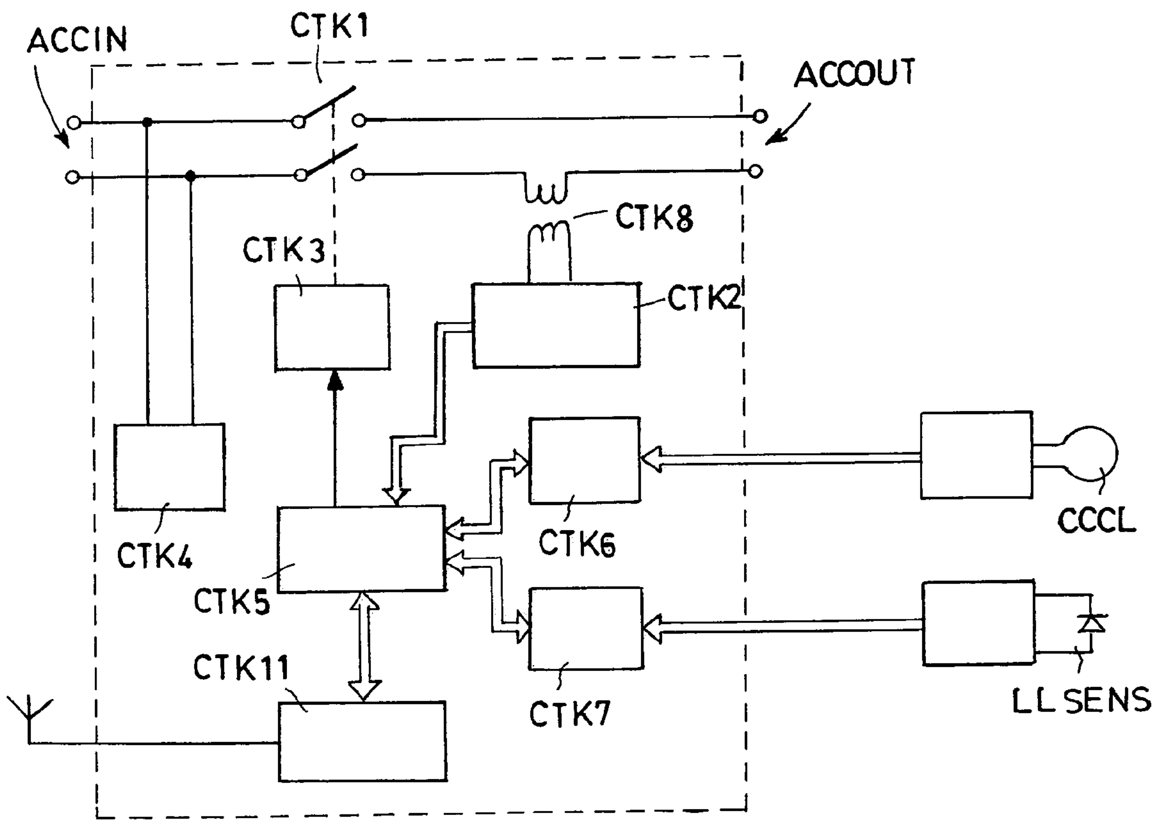
FIG. 8 is a block diagram of the central test radio frequency system applied to the emergency light unit shown in FIGS. 6 and 7.

Also a third solution, shown in FIGS. 6, 7 and 8, is applicable to any emergency light unit L1-L13 and particularly to an existing exit sign emergency unit (the unit indicated with L in FIG. 7); said technical solution has the additional advantage that the CTRF kit module is able to completely monitor the functions without needing to modify the internal electrical connections of the existing emergency light unit L1-L13.

With reference to FIG. 6, the CTRF kit is connected in series with the AC mains supply by means of the cables ACIN and ACOUT and supplies the AC power to the existing emergency unit L1-L13.

Moreover, a current probe CCL is clamped on one battery wire of the existing emergency light unit L1-L13 and connected with a dedicated wire CSENS to the CTRF kit.

The CTRF kit itself integrates another current sensor that senses the AC mains current that is supplied to the emergency unit L1-L13.

As it will be better explained later, the CTRF Kit, detecting and measuring the current drawn by the emergency unit L1-L13 from the AC mains and the current drawn by the incandescent lamps AI from the battery AB, and switching on and off the AC supply delivered to the emergency unit L1-L13, is able to verify and test the emergency unit's functionality.

The integrated AC mains sensor tests the battery charger of the existing emergency light unit L1-L13, while the current clamp CCL on the battery wire tests the emergency function of the light unit L1-L13.

FIG. 7 shows the application of the CTRF Kit to an existing exit sign emergency unit L.

In this case, the CTRF Kit is connected in series to the AC line (cables ACIN and ACOUT) of the existing exit sign unit L as in the previous case, but the emergency function is tested with a light sensor LSENS which is applied to the luminous part of the exit sign emergency unit L.

Also in this case the CTRF Kit integrates an AC switch to switch on and off the AC supply of the existing unit in order to simulate an emergency and then tests the light with the luminous sensor LSENS. In both cases shown in FIG. 6 and in FIG. 7 the CTRF kit integrates the radio transceiver RTRX for the remote control of the test functions.

FIG. 8 shows the block diagram of the CTRF Kit of FIGS. 6 and 7.

With reference to FIG. 8, the CTRF device comprises:

an AC input ACCIN;

a controllable AC switch CTK1, CTK3;

an AC output ACCOUT;

an inside AC current sensor CTK8;

a power supply for the internal circuits CTK4;

a microprocessor CTK5;

a current sensor interface CTK6;

an external current clamp CCCL;

a light sensor interface CTK7;

an external light sensor LLSENS;

a radio transceiver CTK11.

The function is as follows.

The existing emergency unit L is connected to ACCOUT and the AC mains to ACCIN.

In "normal operation" mode the AC switch CTK1 is closed and the existing emergency unit is correctly supplied with the AC mains.

During this phase the microprocessor CTK5 measures the AC current supplied via the internal AC current sensor CTK8, CTK2.

At the same time, if the application is the one described in FIG. 6, the microprocessor CTK5 measures the current supplied to the battery AB via the current clamp CTK6, CCCL.

If the battery AB is a Nichel-Cadmium type or a type charged with continuous trickle current, the microprocessor CTK5 determines a failure if the value of the currents measured is different from the nominal value.

At the opposite, if the battery AB is a Lead type or a type with zero trickle current, the microprocessor CTK5 must determine the correct condition examining the slow reduction of the current measured while the battery AB is properly being charged.

In "emergency test" mode the microprocessor CTK5 controls the AC switch CTK1 off and checks the emergency light function by measuring the current supplied to the incandescent lamps AI via the battery current sensor CCCL and the circuit CTK6; the microprocessor CTK5 simulates an emergency condition and verifies the correct operation of the lamps AI for the required time of the emergency.

Alternatively, in case it is not possible to clamp the DC current sensor on the battery wire, the microprocessor CTK5 detects the correctness of the emergency function by detecting and measuring the luminous flux emitted by the emergency unit L itself via the light sensor LLSENS, CTK7 (as illustrated in FIG. 7).

The light sensor LLSENS must be in this case installed in such a way to intercept the light emitted by the monitored emergency unit L, as illustrated in FIG. 7.

The emergency test can be performed according to the setting of the CTRF Kit for different duration times at the set points, e.g. so called:

- "functional tests" (e.g. 1 minute), a test that simply tests the emergency function and check if the lamps AI are good;
- "duration test" (e.g. 30 minutes, 60 minute, 90 minutes, . . . ), a test that is supposed to check the battery autonomy, because the lamps AI are supplied by the battery AB in the real conditions without the AC power supply applied; the duration test checks both the battery AB and the lamps AI for the required emergency time.

After the emergency test, the microprocessor CTK5 restores the "normal operation" mode closing the AC switch CTK1 and starts again the continuous check of the AC current supplied to the monitored emergency unit L.

The CTRF Kit is completely programmable via the radio frequency transmitter-receiver MR and its working mode and all the parameters can be set accordingly. The electrical installer is able to control the test modes of the monitored light unit L and also to trigger any test at any time operating on the remote control unit CU (FIG. 1), which is connected via radio means to the CTRF Kit.

The invention claimed is:

1. Central test system for emergency lighting comprising a set of emergency light units or emergency lamps (L1-L13) and at least one remote control unit (CU) which is provided for sending and receiving signals to/from said emergency light units (L1-L13) for carrying out functionality tests of said light units (L1-L13), said emergency light units (L1-L13) being also able to carry out diagnostic tests either automatically or due to commands sent by said remote control unit (CU), wherein each of said emergency light units (L1-L13) has a radio frequency transmitter-receiver (MR), which is able to communicate to each other emergency light units (L1-L13) and to the remote control unit (CU) via radio signals, also using said emergency light units (L1-L13) as signal repeaters characterized in that each of said emergency light units (L1-L13), each of said emergency light units having at least one lamp (AI) and a battery (AB) is connected to a retrofit kit, which is connected to the AC mains input energizing the kit and which contains means for implementing the emergency lighting function, the diagnosis function and the radio frequency communication function, said kit being completely programmable via said radio frequency transmitter-receiver (MR) and said kit also being connected via radio means to said remote control unit (CU).

2. Central test system as claimed in claim 1, characterized in that said emergency light units (L1-L13) are installed in at least one building (BA, BB).

3. Central test system as claimed in claim 1, characterized in that each of said emergency light unit or emergency lamp (L1-L13) is able to exchange data and information with at least one of the emergency light units which are adjacent in the system.

4. Central test system as claimed in claim 1, characterized in that said system includes at least one radio frequency receiver-transmitter or at least one radio frequency repeater (RR) functioning as a signal repeater.

5. Central test system as claimed in claim 1, characterized in that said system comprises at least one power repeater (PRR), which allows for a radio link of buildings (BA, BB) or of distinct zones of the same building.

6. Central test system as claimed in claim 1, characterized in that each emergency light unit (L1-L13) has a metal case (MC), on which a dipole antenna (DA) is placed.

7. Central test system as claimed in claim 1, characterized in that each emergency light unit or emergency lamp (L1-L13) has at least one button for setting the test functions and/or display devices for signaling the lamp status, for displaying the test reports, for displaying the charge status of the battery (AB) placed in the emergency light unit (L1-L13) and/or for carrying out locally the functionality test of the emergency lamp and of the battery (AB).

8. Central test system as claimed in claim 1, characterized in that said remote control unit (CU) is connected to at least one interface device (RI) for connecting via radio said emergency light units (L1-L13).

9. Central test system as claimed in claim 1, characterized in that each of said emergency light units or emergency lamps (L1-L13) has one single address and has one single setting code.

10. Central test system as claimed in claim 1, characterized in that said remote control unit (Cu) has at least one serial interface for connecting communicating devices and/or telecommunication networks.

11. Central test system as claimed in claim 1, characterized in that said signals sent and/or received via radio to/from said emergency light units (L1-L13) include assembled data, which are transmitted in a prefixed frequency hand and on different frequencies of said band.

12. Central test system as claimed in claim 1, characterized in that each of said emergency light units (L1-L13) has a radio communication device (MR), which is connected, by means of at least one flat cable (CM), to the processor of the light unit.

13. Central test system as claimed in claim 1, characterized in that said implementing means include a current sensor, a battery charger (BCH) a lamp driver (LPDRV), a diagnostic circuitry (DCH), a radio transceiver (RTRX) enabling the control of each emergency light unit (L1-L13) from said remote control unit (CU) and a microprocessor (MPR), that manages all the functions.

14. Central test system as claimed in claim 1, characterized in that each of said emergency light units (L1-L13) includes an exit sign emergency unit (L), wherein a current probe (CCL) is clamped on one battery wire of the emergency light unit (L1-L13) and is connected through a sensor device (CSENS) to said retrofit kit.

15. Central test system as claimed in claim 14, characterized in that a light sensor (LSENS) is applied to the luminous part of the exit sign emergency unit (L).

16. Central test system as claimed in claim 14, characterized in that said retrofit kit includes an AC input (ACCIN) to which AC mains is connected, a controllable AC switch (CTK1, CTK3), an AC output (ACCOUT) to which said exit sign emergency unit (L) is connected, an AC current sensor (CTK8), a power supply for the internal circuits (CTK4), a microprocessor (CTK5), suitable for measuring the AC current supplied via said AC current sensor (CTK8), for measuring the current supplied to the battery (AB), and for controlling said AC switch (CTK1), a current sensor interface (CTK6), a light sensor interface (CTK7), a light sensor (LLSENS), which is installed in such a way to intercept the light emitted by said exit sign emergency unit (L), and a radio transceiver (CTK11), said retrofit kit being set for different duration times at the set points of the emergency test.

17. Central test system as claimed in claim 14, characterized in that said retrofit kit can be mounted inside or outside the emergency light units (L1-L13) and, in particular, said retrofit kit can be mounted outside the metal enclosure of the emergency light unit (L1-L13) or inside the metal enclosure letting the antenna be outside through a hole in the metal enclosure.

* * * * *